United States Patent
Kuwayama

(10) Patent No.: US 12,311,703 B2
(45) Date of Patent: May 27, 2025

(54) WIRELESS POWER RECEPTION SYSTEM, TIRE/WHEEL ASSEMBLY, AND TIRE

(71) Applicant: BRIDGESTONE CORPORATION, Tokyo (JP)

(72) Inventor: Isao Kuwayama, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 317 days.

(21) Appl. No.: 17/597,669

(22) PCT Filed: Jul. 22, 2020

(86) PCT No.: PCT/JP2020/028511
§ 371 (c)(1),
(2) Date: Jan. 18, 2022

(87) PCT Pub. No.: WO2021/015257
PCT Pub. Date: Jan. 28, 2021

(65) Prior Publication Data
US 2022/0250418 A1 Aug. 11, 2022

(30) Foreign Application Priority Data
Jul. 25, 2019 (JP) .................................. 2019-137240

(51) Int. Cl.
*B60C 15/06* (2006.01)
*B60C 15/04* (2006.01)
(Continued)

(52) U.S. Cl.
CPC .......... *B60C 15/0603* (2013.01); *B60C 15/04* (2013.01); *B60L 53/12* (2019.02);
(Continued)

(58) Field of Classification Search
CPC ...... H02J 50/10; H02J 50/12; B60C 2015/061
See application file for complete search history.

(56) References Cited

U.S. PATENT DOCUMENTS

| | | | |
|---|---|---|---|
| 4,316,637 A * | 2/1982 | Reynolds | B60B 3/06 29/894.38 |
| 8,371,159 B2 | 2/2013 | Morinaga | |

(Continued)

FOREIGN PATENT DOCUMENTS

| | | |
|---|---|---|
| CN | 102457108 A | 5/2012 |
| CN | 102666142 A | 9/2012 |

(Continued)

OTHER PUBLICATIONS

O. Shimizu, T. Imura, H. Fujimoto, D. Gunji, K. Akutagawa and G. Guidi, "Mutual Inductance Modeling of In-Wheel Arc-Shaped Coil for In-Motion WPT," 2019 IEEE Wireless Power Transfer Conference (WPTC), London, UK. Jun. 2019, pp. 624-628. (Year: 2019).*

(Continued)

*Primary Examiner* — Robert C Dye
(74) *Attorney, Agent, or Firm* — KENJA IP LAW PC

(57) ABSTRACT

A wireless power reception system includes a power transmission device, a power reception device, a wheel with a rim, and a tire mounted on the rim. The tire includes a bead core and a bead filler, a tire width direction cross-sectional area S1 of the bead filler is one to eight times a tire width direction cross-sectional area S2 of the bead core, the power transmission device can transmit electric power with a frequency of 1000 kHz or less wirelessly, the power reception device is disposed farther inward in the tire radial direction than a tread portion of the tire, the power reception device receives the electric power wirelessly from the power transmission device in a state such that the power transmission device is located farther outward in the tire radial direction than the tire, and the tread portion of the tire is formed from a non-magnetic material.

8 Claims, 4 Drawing Sheets

(51) Int. Cl.
*B60L 53/12* (2019.01)
*H02J 50/10* (2016.01)
*B60C 13/00* (2006.01)
*B60M 7/00* (2006.01)

(52) U.S. Cl.
CPC ........ *H02J 50/10* (2016.02); *B60C 2013/007* (2013.01); *B60C 2015/061* (2013.01); *B60L 2220/44* (2013.01); *B60M 7/00* (2013.01)

(56) References Cited

U.S. PATENT DOCUMENTS

| | | |
|---|---|---|
| 8,881,783 B2 | 11/2014 | Katayama |
| 9,180,779 B2 | 11/2015 | Oyobe et al. |
| 9,329,032 B2 | 5/2016 | Oda |
| 10,207,541 B2 | 2/2019 | Kuwayama et al. |
| 10,644,544 B2 | 5/2020 | Kanno |
| 2007/0169972 A1* | 7/2007 | Suzuki ................ B60K 7/0007 180/65.51 |
| 2011/0031047 A1 | 2/2011 | Tarr |
| 2011/0186368 A1 | 8/2011 | Ueno et al. |
| 2012/0161696 A1* | 6/2012 | Cook ...................... B60L 3/04 320/108 |
| 2012/0217819 A1* | 8/2012 | Yamakawa ............. H02J 50/70 307/104 |
| 2014/0209228 A1 | 7/2014 | Kuwayama et al. |
| 2015/0020943 A1* | 1/2015 | Stuckey ............... B60C 9/2003 152/526 |
| 2015/0251546 A1* | 9/2015 | Oyobe ................. H01F 27/006 307/10.1 |
| 2016/0236512 A1* | 8/2016 | Kuwayama ............ B60C 15/04 |
| 2017/0141368 A1* | 5/2017 | Ricci ...................... B60L 53/52 |
| 2017/0291459 A1 | 10/2017 | Kuwayama et al. |
| 2017/0305193 A1 | 10/2017 | Kuwayama et al. |
| 2021/0260938 A1* | 8/2021 | Tanno ..................... B60C 5/14 |

FOREIGN PATENT DOCUMENTS

| | | |
|---|---|---|
| CN | 103889739 A | 6/2014 |
| CN | 106715157 A | 5/2017 |
| CN | 106715158 A | 5/2017 |
| EP | 2196351 A1 | 6/2010 |
| EP | 2455253 A2 | 5/2012 |
| JP | H08126106 A | 5/1996 |
| JP | 2002219914 A | 8/2002 |
| JP | 2009106136 A | 5/2009 |
| JP | 2012030740 A | 2/2012 |
| JP | 2012110211 A | 6/2012 |
| JP | 2013063765 A | 4/2013 |
| JP | 2013104792 A | 5/2013 |
| JP | 2014195350 A | 10/2014 |
| JP | 2018068077 A | 4/2018 |
| WO | 2009008502 A1 | 1/2009 |
| WO | 2019244349 A1 | 12/2019 |

OTHER PUBLICATIONS

Jul. 24, 2023, search result of the Extended European Search Report issued by the European Patent Office in the corresponding European Patent Application No. 20843235.1.

Jan. 25, 2022, International Preliminary Report on Patentability issued in the International Patent Application No. PCT/JP2020/028511.

Oct. 13, 2020, International Search Report issued in the International Patent Application No. PCT/JP2020/028511.

Feb. 29, 2024, search result of Office Action issued by the China National Intellectual Property Administration in the corresponding Chinese Patent Application No. 202080052629.4.

\* cited by examiner

WIRELESS POWER RECEPTION SYSTEM, TIRE/WHEEL ASSEMBLY, AND TIRE

TECHNICAL FIELD

The present disclosure relates to a wireless power reception system, a tire/wheel assembly, and a tire.

The present application claims priority to Japanese Patent Application No. 2019-137240 filed on Jul. 25, 2019, the entire contents of which are incorporated herein by reference.

BACKGROUND

Technology has been proposed for a power reception device mounted on the underside of a vehicle body to receive electric power wirelessly from a power transmission device installed in a road, a parking lot, or the like. For example, see Patent Literature (PTL) 1.

CITATION LIST

Patent Literature

PTL 1: JP 2018-068077 A

SUMMARY

Technical Problem

I newly discovered technology that enables good electric power reception through a tire in a moveable body with a tire, leading to the present disclosure.

The present disclosure provides a wireless power reception system, a tire/wheel assembly, and a tire capable of good reception of electric power through a tire.

Solution to Problem

A first wireless power reception system according to the present disclosure includes:
  a power transmission device;
  a power reception device;
  a wheel including a rim; and
  a tire mounted on the rim, wherein
  the tire includes a bead core and a bead filler,
  a cross-sectional area S1 of the bead filler in a tire width direction is one or more times and eight or less times a cross-sectional area S2 of the bead core in the tire width direction,
  the power transmission device is configured to transmit electric power with a frequency of 1000 kHz or less wirelessly,
  the power reception device is disposed farther inward in a tire radial direction than a tread portion of the tire,
  the power reception device is configured to receive the electric power wirelessly from the power transmission device in a state such that the power transmission device is located farther outward in the tire radial direction than the tire, and
  the tread portion of the tire is formed from a non-magnetic material.

A first tire/wheel assembly according to the present disclosure is a tire/wheel assembly used in the aforementioned first wireless power reception system and includes:
  the aforementioned wheel; and
  the aforementioned tire.

A first tire according to the present disclosure is the tire used in the aforementioned first wireless power reception system, wherein the tread portion is formed from a non-magnetic material.

A second wireless power reception system according to the present disclosure includes:
  a power transmission device;
  a power reception device;
  a wheel including a rim; and
  a tire mounted on the rim, wherein
  the tire includes a bead core and a bead filler,
  a cross-sectional area S1 of the bead filler in a tire width direction is one or more times and eight or less times a cross-sectional area S2 of the bead core in the tire width direction,
  the power transmission device is configured to transmit electric power with a frequency higher than 1000 kHz wirelessly,
  the power reception device is disposed farther inward in a tire radial direction than a tread portion of the tire,
  the power reception device is configured to receive the electric power wirelessly from the power transmission device in a state such that the power transmission device is located farther outward in the tire radial direction than the tire, and
  the tread portion of the tire is formed from a non-magnetic material or partially formed from a magnetic material.

A second tire/wheel assembly according to the present disclosure is a tire/wheel assembly used in the aforementioned second wireless power reception system and includes:
  the aforementioned wheel; and
  the aforementioned tire.

A second tire according to the present disclosure is the tire used in the aforementioned second wireless power reception system, wherein the tread portion is formed from a non-magnetic material or is partially formed from a magnetic material.

Advantageous Effect

According to the present disclosure, a wireless power reception system, a tire/wheel assembly, and a tire capable of good reception of electric power through a tire can be provided.

DETAILED DESCRIPTION

The wireless power reception system, the tire/wheel assembly, and the tire of the present disclosure are suitable for use in any moveable body with tires, such as, for example, vehicles, motorcycles, wheelchairs, and carts.

Examples of vehicles include passenger vehicles, trucks, buses, agricultural vehicles (such as tractors), and construction or building vehicles (such as dump trucks), with passenger vehicles being particularly suitable.

Embodiments of a wireless power reception system, a tire/wheel assembly, and a tire of the present disclosure will be described using examples, with reference to the drawings.

Unless otherwise noted, the aforementioned "first wireless power reception system of the present disclosure" and the aforementioned "second wireless power reception system of the present disclosure" are collectively referred to as the "wireless power reception system of the present disclosure" or the like, the aforementioned "first tire/wheel assembly of the present disclosure" and the aforementioned "second tire/wheel assembly of the present disclosure" are collectively referred to as the "tire/wheel assembly of the present disclosure" or the like, and the "first tire of the present disclosure" and the "second tire of the present disclosure" are collectively referred to as the "tire of the present disclosure" or the like.

Members and components that are common across drawings are labeled with the same reference signs.

[Overall Configuration of Wireless Power Reception System]

Figure 1:
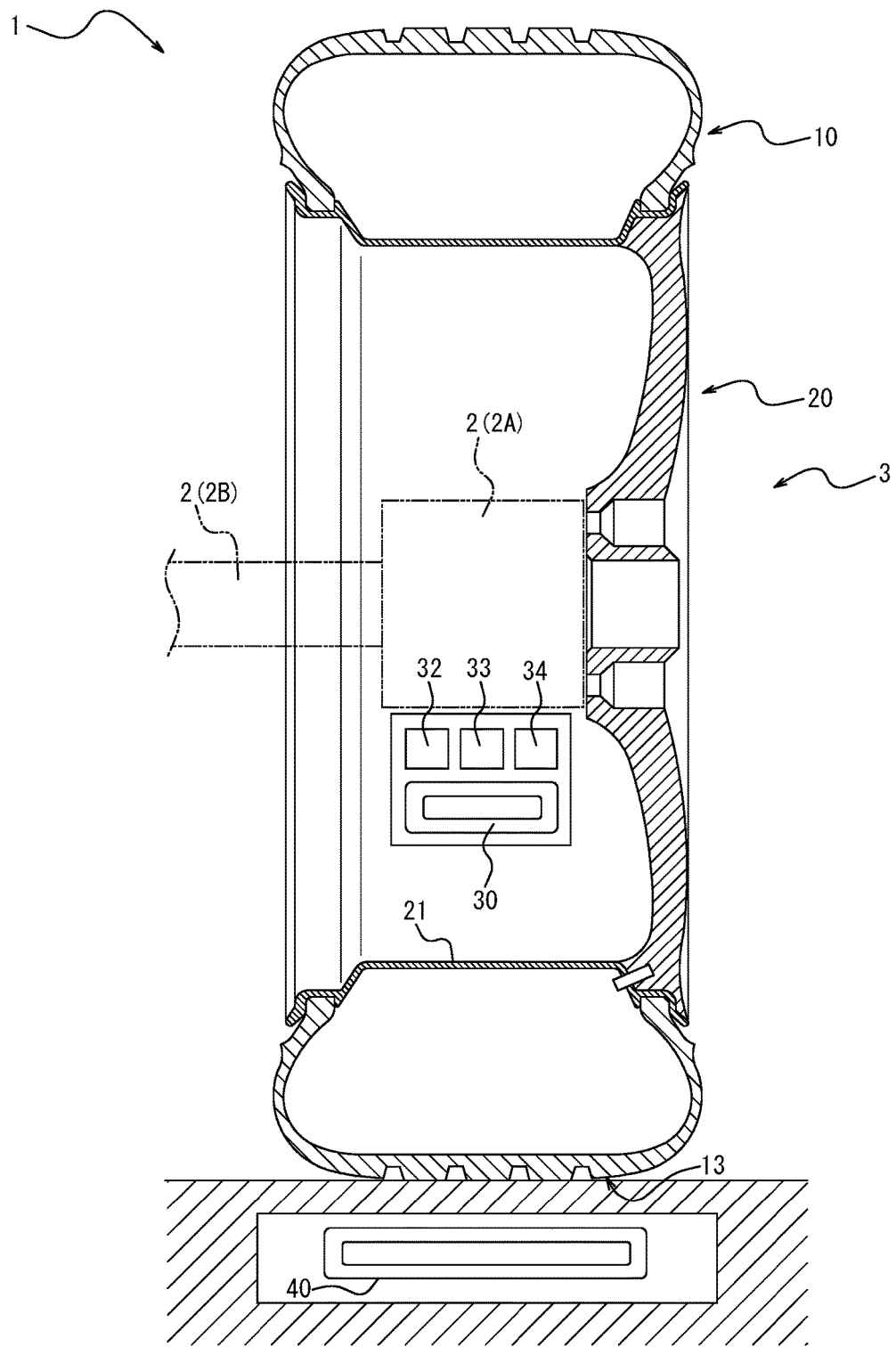
FIG. 1 is a diagram schematically illustrating a wireless power reception system according to an embodiment of the present disclosure, using a cross-section in the tire width direction.

First, the overall configuration of the wireless power reception system 1 according to an embodiment of the present disclosure is described with reference to FIG. 1. FIG. 1 is a diagram schematically illustrating a wireless power reception system 1 according to an embodiment of the present disclosure, using a cross-section in the tire width direction.

The wireless power reception system 1 of the present embodiment includes a power transmission device 40, a power reception device 30, and a tire/wheel assembly 3 according to an embodiment of the present disclosure. The tire/wheel assembly 3 is for attachment to a vehicle 2, and includes a wheel 20, having a rim 21, and a tire 10 according to an embodiment of the present disclosure mounted on the rim 21. The vehicle 2 is, for example, a passenger vehicle, a truck, a bus, an agricultural vehicle (such as a tractor), a construction or building vehicle (such as a dump truck), or the like. The vehicle 2 includes a drive shaft 2B and a hub 2A.

The wireless power reception system 1 may include one or more of each of the power transmission device 40, the power reception device 30, and the tire/wheel assembly 3. One or more of the power reception devices 30 may be provided for one tire/wheel assembly 3.

The power transmission device 40 is configured to transmit electric power wirelessly.

The power reception device 30 is provided inside the tire/wheel assembly 3, and more specifically, is disposed farther inward in the tire radial direction than a tread portion 13 of the tire 10 in a tire width direction region corresponding to the tire 10. The power reception device 30 is configured to receive electric power wirelessly from the power transmission device 40 at least in a state in which the power transmission device 40 is positioned farther outward, in the tire radial direction, than the tire 10 in the tire width direction region corresponding to the tire 10.

The power transmission device 40 is configured by a power transmission coil (primary coil) (power transmission coil 40). A power source (not illustrated) is connected to the power transmission device 40. The power transmission device 40 is installed on the road surface of a road or the like or is buried so as to be located near a road surface. The power transmission coil 40 is configured to generate an alternating current (AC) magnetic field based on an AC current supplied from a power source (not illustrated). In the present embodiment, the power transmission device 40 transmits electric power wirelessly by the power transmission coil 40 generating the AC magnetic field.

The power transmission coil 40 is configured to be ring-shaped overall and is arranged so that the axial direction of the ring is substantially perpendicular to the road surface to generate an AC magnetic field above the road surface. For the sake of clarity in FIG. 1, however, the power transmission coil 40 is illustrated in a different orientation (directivity) than the actual orientation.

The power transmission coil 40 is, for example, wound around a core such as a ferrite core and is configured to be ring-shaped overall, but this example is not limiting. The power transmission coil 40 can be any coil capable of generating an AC magnetic field, such as a coil spring, an air-core coil, or the like.

In the present embodiment, the power reception device 30 includes a power reception coil (secondary coil) (hereinafter, the power reception device 30 is also referred to as a "power reception coil 30"). The power reception coil 30 is configured to be ring-shaped overall. The power reception coil 30 is arranged so that the axial direction of the ring is substantially perpendicular to the road surface so as to be opposite the power transmission coil 40 in a state in which the tire/wheel assembly 3 is positioned above the power transmission device 40 (and thus the power transmission device 40 is positioned farther outward in the tire radial direction than the tire 10). The axial direction of the ring of the power reception coil 30 is, for example, made substantially parallel to the tire radial direction. For the sake of clarity in FIG. 1, however, the power reception coil 30 is illustrated in a different orientation (directivity) than the actual orientation.

The power reception coil 30 is, for example, wound around a core such as a ferrite core and is configured to be ring-shaped overall, but this example is not limiting. The power reception coil 30 can be any coil capable of generating an electromotive force based on an AC magnetic field, such as a coil spring, an air-core coil, or the like.

Since the power transmission device 40 and the power reception device 30 are configured as described above, when the tire 10 drives over or stops on the power transmission device 40 so that the tire 10 is positioned on the power transmission device 40 (and hence the power transmission device 40 is positioned farther outward in the tire radial direction than the tire 10), the power transmission device 40 can supply power to the power reception device 30 by electromagnetic induction. That is, as a result of an AC magnetic field being generated substantially perpendicularly upwards by the power transmission device 40, an electromotive force is generated in the power reception device 30 by electromagnetic induction, and an electric current starts to flow (i.e., the power reception coil 30 receives electric power). This enables good reception of electric power through the tire 10.

In the present specification, stating that the power transmission device 40 "transmits electric power wirelessly" does not refer only to the case of actually transmitting electric current, but rather refers to the overall action of the power transmission device 40 so that the power reception device 30 can receive electric power, and in the present embodiment, this refers to the power transmission device 40 generating an AC magnetic field. Similarly, stating that the power reception device 30 "receives electric power wirelessly" does not refer only to the case of the power reception device 30 actually receiving electric current, but rather refers to the overall case of the power reception device 30 receiving electric power through the action of the power transmission device 40, and in the present embodiment, this refers to an electromotive force being generated and electric current flowing in the power reception device 30.

Since the tread portion 13 of the tire 10 is in contact with the road surface when the power reception device 30 receives power, the risk of obstacles coming between the power reception device 30 and the power transmission device 40 can be reduced, and thus the power receiving efficiency of the power reception device 30 during wireless power supply can be improved.

Although the power reception device 30 is attached to the hub 2A of the vehicle 2 in the example of FIG. 1, this example is not limiting. The power reception device 30 can be attached to any position, inside the tire/wheel assembly 3, that is within the tire width direction region corresponding to the tire 10 and is farther inward in the tire radial direction than the tread portion 13 of the tire 10. For example, the power reception device 30 may be attached to the drive shaft 2B of the vehicle 2, attached to the rim 21 and disposed on the inner periphery or outer periphery of the rim 21, or attached to the inner surface of the tire 10. From the perspective of power receiving efficiency, the power reception device 30 is preferably disposed at least within the tire width direction region corresponding to the tread portion 13, as in the example of FIG. 1.

In the example of FIG. 1, only one power reception device 30 is provided for one tire/wheel assembly 3, but one or more power reception devices 30 may be provided for one tire/wheel assembly 3.

However, in the case in which the power reception device 30 is attached to a position so as not to rotate with the rotation of the tire 10 (for example, when attached to the hub 2A as in the example of FIG. 1), it suffices for only one power reception device 30 to be installed at a position facing the road surface. In the case in which the power reception device 30 is attached to a position so as to rotate with the rotation of the tire 10 (for example, when attached to the drive shaft 2B, the rim 21, or the tire 10), a plurality of power reception devices 30 are preferably arranged along the tire circumferential direction.

As illustrated in FIG. 1, the wireless power reception system 1 may further include a power conversion circuit 32, an electricity storage 33, and a controller 34 inside the tire/wheel assembly 3 (preferably inside the wheel 20).

The power conversion circuit 32 converts the AC power generated in the power reception coil 30 into direct current (DC) power, and supplies the DC power to the electricity storage 33 or other on-board devices in the vehicle 2 via conductive wires or the like.

The electricity storage 33 stores the electric power generated by the power reception coil 30. The electricity storage 33 is, for example, a capacitor, but this example is not limiting. The electricity storage 33 can be any electricity storage device, such as a storage battery. In the case in which the electricity storage 33 is a capacitor, charging and discharging is quicker than with a storage battery. For this reason, the electricity storage 33 that is a capacitor is advantageous when a high degree of immediacy is required, such as when storing the electric power generated in the power reception coil 30 while the vehicle 2 drives over the power transmission device 40 provided on the road.

The controller 34 may include one or more processors that perform processing for controlling the functions of the power reception device 30. The controller 34 may be a general-purpose processor, such as a central processing unit (CPU) that executes a program specifying control procedures, or a dedicated processor that is specialized for processing of each function. The controller 34 may include any means used to control the power reception device 30, such as storage means for storing programs and the like, and communication means for wired or wireless communication with external electronic devices.

[Tire Configuration]

Next, the configuration of the tire 10 according to an embodiment of the present disclosure, as used in the above-described wireless power reception system 1 according to an embodiment of the present disclosure, is described in greater detail with reference to FIG. 2.

I newly discovered that the power receiving efficiency can be improved by optimizing the configuration of the tire 10 according to the frequency of the electric power transmitted from the power transmission device 40 (and hence the frequency of the AC current supplied from the power source to the power transmission device 40, the frequency of the AC magnetic field transmitted from the power transmission device 40, and the frequency of the electric power received by the power reception device 30).

More specifically, I newly discovered that in the case in which the power transmission device 40 is configured to transmit power wirelessly at a frequency of 1000 kHz or less (preferably 500 kHz or less), the inclusion of a magnetic material (such as steel) in a portion of the tire 10 mainly located between the power transmission device 40 and the power reception device 30 significantly increases the loss of electric power during power reception as compared to when the tire 10 does not contain a magnetic material. I also newly discovered that in the case in which the power transmission device 40 is configured to transmit power wirelessly at a frequency of 1000 kHz or less (preferably 500 kHz or less), a configuration that, insofar as possible, avoids the inclusion of a magnetic material (such as steel) in a portion of the tire 10 mainly located between the power transmission device 40 and the power reception device 30 can suppress the loss of electric power during power reception and improve the power receiving efficiency.

Furthermore, I newly discovered that in the case in which the power transmission device 40 is configured to transmit power wirelessly at a higher frequency than 1000 kHz (preferably higher than 2000 kHz), a configuration in which the tire 10 includes a magnetic material (such as steel) in a portion mainly located between the power transmission device 40 and the power reception device 30 has no loss of electric power during power reception in a nearly equivalent manner to when a magnetic material is not included. I have also newly discovered that in the case in which the power transmission device 40 is configured to transmit power wirelessly at a higher frequency than 1000 kHz (preferably higher than 2000 kHz), the loss of electric power during power reception can be suppressed, and good power reception can be achieved, regardless of whether the tire 10 includes a magnetic material in a portion mainly located between the power transmission device 40 and the power reception device 30.

The configuration of the tire 10 described below is based on these findings.

For the sake of convenience, in the following description, the case in which the power transmission device 40 is configured to transmit power wirelessly at a frequency of 1000 kHz or less (preferably, 500 kHz or less) is referred to as the "low frequency case", and the case in which the power transmission device 40 is configured to transmit power wirelessly at a frequency higher than 1000 kHz (preferably higher than 2000 kHz) is referred to as the "high frequency case".

Unless otherwise specified, the positional relationships and the like of elements are assumed below to be measured in a reference state in which the tire 10 is mounted on the rim 21, which is an applicable rim, and filled to a prescribed internal pressure, with no load applied. The width in the tire width direction of the contact patch in contact with the road surface when the tire 10 is mounted on the rim 21, which is an applicable rim, and filled to the prescribed internal pressure, with the maximum load applied, is referred to as the ground contact width of the tire, and the edges in the tire width direction of the contact patch are referred to as the ground contact edges.

In the present specification, the "applicable rim" refers to a standard rim of an applicable size, such as the Measuring Rim in the STANDARDS MANUAL of the European Tyre and Rim Technological Organisation (ETRTO) in Europe or the Design Rim in the YEAR BOOK of the Tire and Rim Association, Inc. (TRA) in the USA, that is described, or will be described in the future, in industrial standards effective in the region where the pneumatic tire is manufactured and used, such as the JATMA YEAR BOOK published by the Japan Automobile Tyre Manufacturers Association (JATMA) in Japan, the STANDARDS MANUAL of the ETRTO, and the YEAR BOOK of the TRA. In the case of a size not specified in the aforementioned industrial standards, the "rim" refers to a rim whose width corresponds to the bead width of the pneumatic tire. The "applicable rim" includes sizes that will be described in the future in the aforementioned industrial standards, in addition to current sizes. Examples of the "sizes that will be described in the future" include the sizes described under "FUTURE DEVELOPMENTS" in the ETRTO STANDARDS MANUAL 2013.

In the present specification, the "prescribed internal pressure" refers to the air pressure (maximum air pressure) corresponding to the maximum load capability of a single wheel for the applicable size/ply rating in industrial standards, such as the aforementioned JATMA YEAR BOOK. In the case of a size not described in the aforementioned industrial standards, the "prescribed internal pressure" refers to the air pressure (maximum air pressure) corresponding to the maximum load capability prescribed for each vehicle on which the tire is mounted. In the present specification, the "maximum load" refers to the load corresponding to the maximum load capability for a tire of the applicable size described in the aforementioned industrial standards. In the case of a size not described in the aforementioned industrial standards, the "maximum load" refers to the load corresponding to the maximum load capability prescribed for each vehicle on which the tire is mounted.

Figure 2:
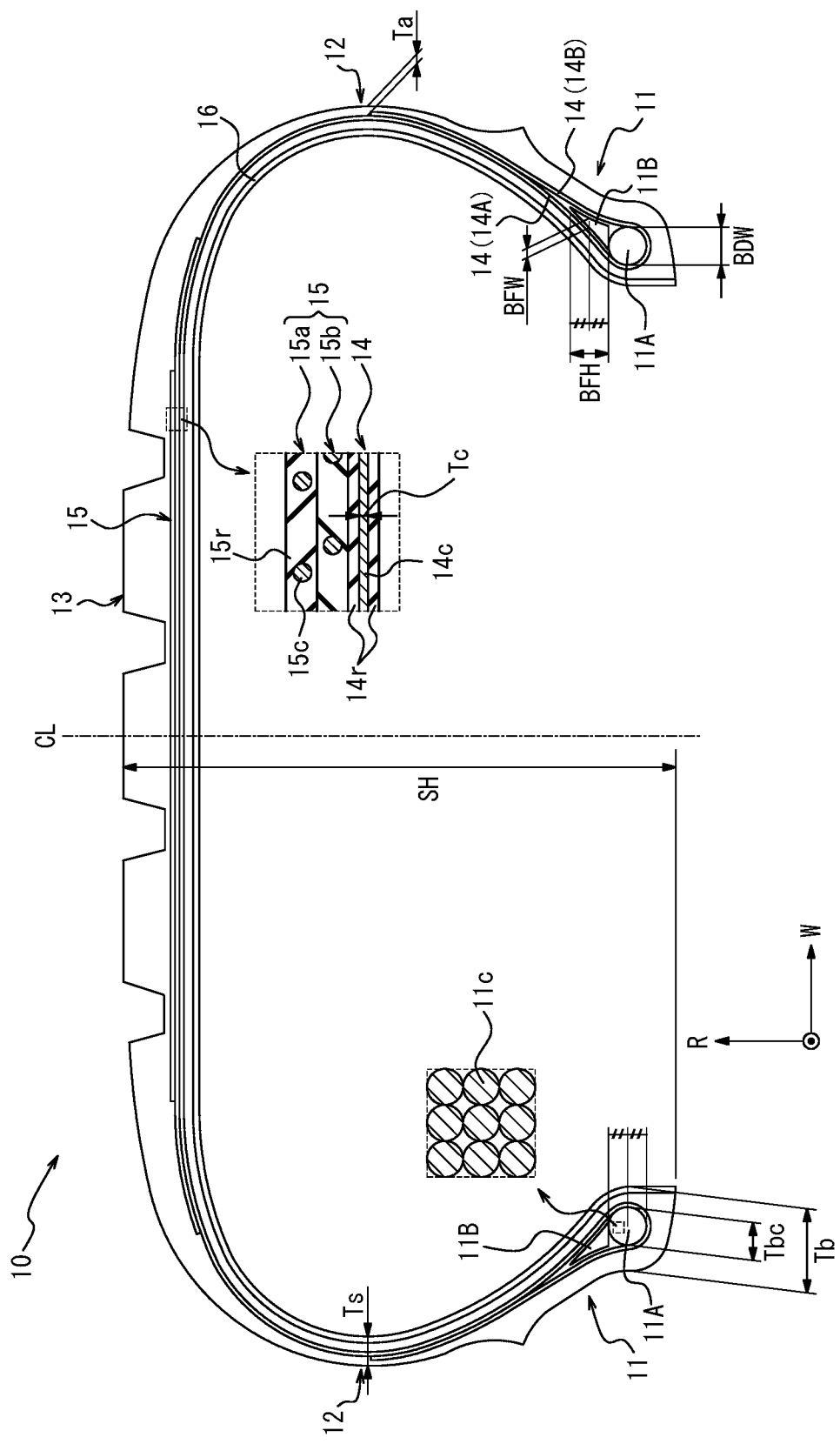
FIG. 2 is a cross-sectional view in the tire width direction, illustrating the tire of FIG. 1.

FIG. 2 is a cross-sectional view, in the tire width direction, of the tire 10 of the present embodiment cut along the tire width direction. In the present specification, the tire width direction refers to a direction parallel to the axis of rotation of the tire 10. In FIG. 2, the tire width direction is indicated by an arrow W. The tire radial direction refers to a direction perpendicular to the axis of rotation of the tire 10. In FIG. 2, the tire radial direction is indicated by the arrow R. In the present embodiment, the tire 10 is described as having a symmetrical configuration with respect to the tire equatorial plane CL, but this example is not limiting. The tire 10 can have an asymmetrical configuration with respect to the tire equatorial plane CL.

In the present specification, the side closer to the axis of rotation of the tire 10 along the tire radial direction is referred to as the "tire radial inner side" or the "tire inner peripheral side", and the side farther from the axis of rotation of the tire 10 along the tire radial direction is referred to as the "tire radial outer side" or the "tire outer peripheral side". The side closer to the tire equatorial plane CL along the tire width direction is referred to as the "tire widthwise inner side", and the side farther from the tire equatorial plane CL along the tire width direction is referred to as the "tire widthwise outer side".

As illustrated in FIG. 2, the tire 10 includes a pair of bead portions 11, a pair of sidewall portions 12, each of which is continuous from a bead portion 11 outward in the tire radial direction, and the tread portion 13 between the pair of sidewall portions 12. The tread portion 13 is the tire widthwise portion between the pair of ground edges.

In the case of a low frequency, the tread portion 13 is preferably formed only from a non-magnetic material. This can improve the power receiving efficiency as compared to if the tread portion 13 were to include a magnetic material (such as steel).

On the other hand, in the case of a high frequency, good power reception can be achieved regardless of the material forming the tread portion 13. Specifically, the tread portion 13 is preferably formed only from a non-magnetic material, or only formed partially from a magnetic material (the remainder being formed from a non-magnetic material).

Since the tread portion 13 is located between the power transmission device 40 and the power reception device 30 during power reception (and hence at a position through which electric power (specifically, a magnetic field in the present embodiment) mainly passes), such optimization of the material of the tread portion 13 contributes greatly to improving the power receiving efficiency.

Non-magnetic materials include paramagnetic and diamagnetic materials with low magnetic permeability. Resin materials can be used as non-magnetic materials, examples of which include thermoplastic resins such as polyester and nylon, thermosetting resins such as vinyl ester resin and unsaturated polyester resins, and other synthetic resins. The resin material can further include fibers of glass, carbon, graphite, aramid, polyethylene, ceramic, and the like as reinforcing fibers. The non-magnetic material is not limited to resin, and any non-metallic material, including rubber, glass, carbon, graphite, aramid, polyethylene, and ceramic, can be used.

Furthermore, a metallic material can be used as the non-magnetic material, including a paramagnetic material such as aluminum or a diamagnetic material such as copper.

A magnetic material is a material that exhibits ferromagnetism (ferromagnetic material), such as steel.

The tire 10 includes a carcass 14. The carcass 14 extends in a toroidal shape between a pair of bead cores 11A and forms the framework of the tire. The end sides of the carcass 14 are engaged with the bead cores 11A. Specifically, the carcass 14 has a carcass body portion 14A disposed between the bead cores 11A and carcass folded-up portions 14B that are folded up from the tire widthwise inner side towards the tire widthwise outer side around the bead cores 11A. The length of the carcass folded-up portion 14B can be freely set. The carcass 14 can have a structure without the carcass folded-up portions 14B, or a structure in which the carcass folded-up portions 14B are wrapped around the bead cores 11A.

The carcass 14 can be configured by one or more carcass layers (one in the example of FIG. 2). For example, the carcass 14 can be configured by two carcass layers stacked in the tire radial direction at the tire equatorial plane CL. As illustrated in the partial enlargement in FIG. 2, each carcass layer includes one or more carcass cords 14c and a coating rubber 14r that coats the carcass cords 14c. The carcass cords 14c can be formed from monofilaments or twisted wires.

In the case of a low frequency, the carcass cords 14c are preferably formed only from a non-magnetic material. This can improve the power receiving efficiency as compared to if the carcass cords were formed from a magnetic material (such as steel). Alternatively, the carcass cords 14c may be formed from a non-magnetic material only in a portion of the carcass 14 including the portion forming the tread portion 13, and the remaining portion may be formed from a magnetic material.

On the other hand, in the case of a high frequency, good power reception can be achieved regardless of whether the carcass cords 14c are formed from a non-magnetic material or a magnetic material.

Since the portion of the carcass 14 mainly forming the tread portion 13 is located between the power transmission device 40 and the power reception device 30 during power reception, such optimization of the material of the carcass 14 contributes greatly to improving the power receiving efficiency.

In the case in which the carcass cords 14c are formed from a non-magnetic material, the carcass cords 14c can be configured by any resin material, such as polyester, nylon, rayon, and aramid, as well as any other non-magnetic material.

The carcass 14 may have a radial structure or a bias structure. The carcass 14 may be integrally formed entirely from the above-described resin material or the like, without use of the carcass cords 14c. Furthermore, it is possible to form only a portion of the carcass 14, including the portion configuring the tread portion 13, from a non-magnetic material, with other portions being formed to include a magnetic material.

A belt 15 reinforcing the tread portion 13 is provided on the tire radial direction outer side of the carcass 14 in the tread portion 13. Tread rubber is provided on the outer periphery of the belt 15 in the tire radial direction.

The belt 15 can, for example, be formed by one or more (two in the example of FIG. 2) belt layers 15a, 15b stacked in the tire radial direction. As illustrated in the partial enlargement in FIG. 2, each of the belt layers 15a, 15b includes one or more belt cords 15c and a coating rubber 15r that coats the belt cords 15c. The belt cords 15c can be formed from monofilaments or twisted wires.

In the case of a low frequency, the belt cords 15c are preferably formed only from a non-magnetic material. This can improve the power receiving efficiency as compared to if the belt cords 15c were formed from a magnetic material (such as steel). Alternatively, the belt cords 15c may be formed from a non-magnetic material only in a portion of the belt 15 including the portion configuring the tread portion 13, and the remaining portion may be formed from a magnetic material.

On the other hand, in the case of a high frequency, good power reception can be achieved regardless of whether the belt cords 15c are formed from a non-magnetic material or a magnetic material.

Since most or all of the belt 15 is located in the tread portion 13, between the power transmission device 40 and the power reception device 30 during power reception, such optimization of the material of the belt 15 contributes greatly to improving the power receiving efficiency.

In the case in which the belt cords 15c are formed from a non-magnetic material, the belt cords 15c can be configured by any resin material, such as polyester, nylon, rayon, and aramid, as well as any other non-magnetic material.

The belt 15 may be integrally formed entirely from the above-described resin material or the like, without use of the belt cords 15c. Furthermore, it is possible to form only a portion of the belt 15, including the portion configuring the tread portion 13, from a non-magnetic material, with other portions being formed to include a magnetic material.

The two bead portions 11 each include a bead core 11A and a bead filler 11B. As illustrated in the partial enlargement in FIG. 2, the bead core 11A is provided with a plurality of bead wires 11c surrounded by a rubber coating. The bead wires 11c can be formed from monofilaments or twisted wires. The bead fillers 11B are formed from rubber or the like and are positioned farther outward in the tire radial direction than the bead cores 11A. In the present embodiment, the thickness of the bead filler 11B decreases outward in the tire radial direction. However, the tire 10 can be structured without the bead fillers 11B. The bead portion 11 is configured to contact the rim on the inner side in the tire radial direction and the outer side in the tire width direction when the tire 10 is mounted on the rim.

The bead portions 11 tend to be located farther outward in the tire width direction than the power transmission device 40 and the power reception device 30 during power reception and therefore have less effect on the power receiving efficiency than the tread portion 13.

Accordingly, in the case of a low frequency, good power reception can be achieved regardless of whether the bead wires 11c are formed from a non-magnetic material or magnetic material (such as steel).

In the case of a high frequency, good power reception can be achieved regardless of whether the bead wires 11c are formed from a non-magnetic material or a magnetic material.

In the case in which the bead wires 11c are formed from a non-magnetic material, the bead wires 11c can be configured by any resin material, such as polyester, nylon, rayon, and aramid, as well as any other non-magnetic material.

The sidewall portions 12 tend to be located farther outward in the tire width direction than the power transmission device 40 and the power reception device 30 during power reception and therefore have less effect on the power receiving efficiency than the tread portion 13.

Accordingly, in the case of a low frequency, good power reception can be achieved regardless of whether the sidewall portions 12 are formed only from a non-magnetic material (such as rubber) or are formed to include a magnetic material. Forming the sidewall portions 12 to include a magnetic material can suppress attenuation of the magnetic field transmitted from the power transmission device 40 to the power reception device 30 due to the influence of other magnetic fields and of metal that may exist outside the sidewall portions 12 in the tire width direction, thereby improving the power receiving efficiency.

On the other hand, in the case of a high frequency, good power reception can be achieved regardless of whether the sidewall portions 12 are formed only from a non-magnetic material (such as rubber) or are formed to include a magnetic material.

An example of the magnetic material that can be included in the sidewall portions 12 is ferrite.

The tire 10 includes an inner liner 16. The inner liner 16 is disposed to cover the inner wall surface of the tire 10. The inner liner 16 can be configured by a plurality of inner liner layers stacked in the tire radial direction at the tire equatorial plane CL. The inner liner 16 is, for example, configured by a butyl-based rubber having low air permeability. Examples of butyl-based rubber include butyl rubber and butyl halide rubber, which is a derivative thereof. The inner liner 16 is not limited to butyl-based rubber and can be configured by other rubber compositions, resins, or elastomers.

[Wheel Configuration]

Figure 3:
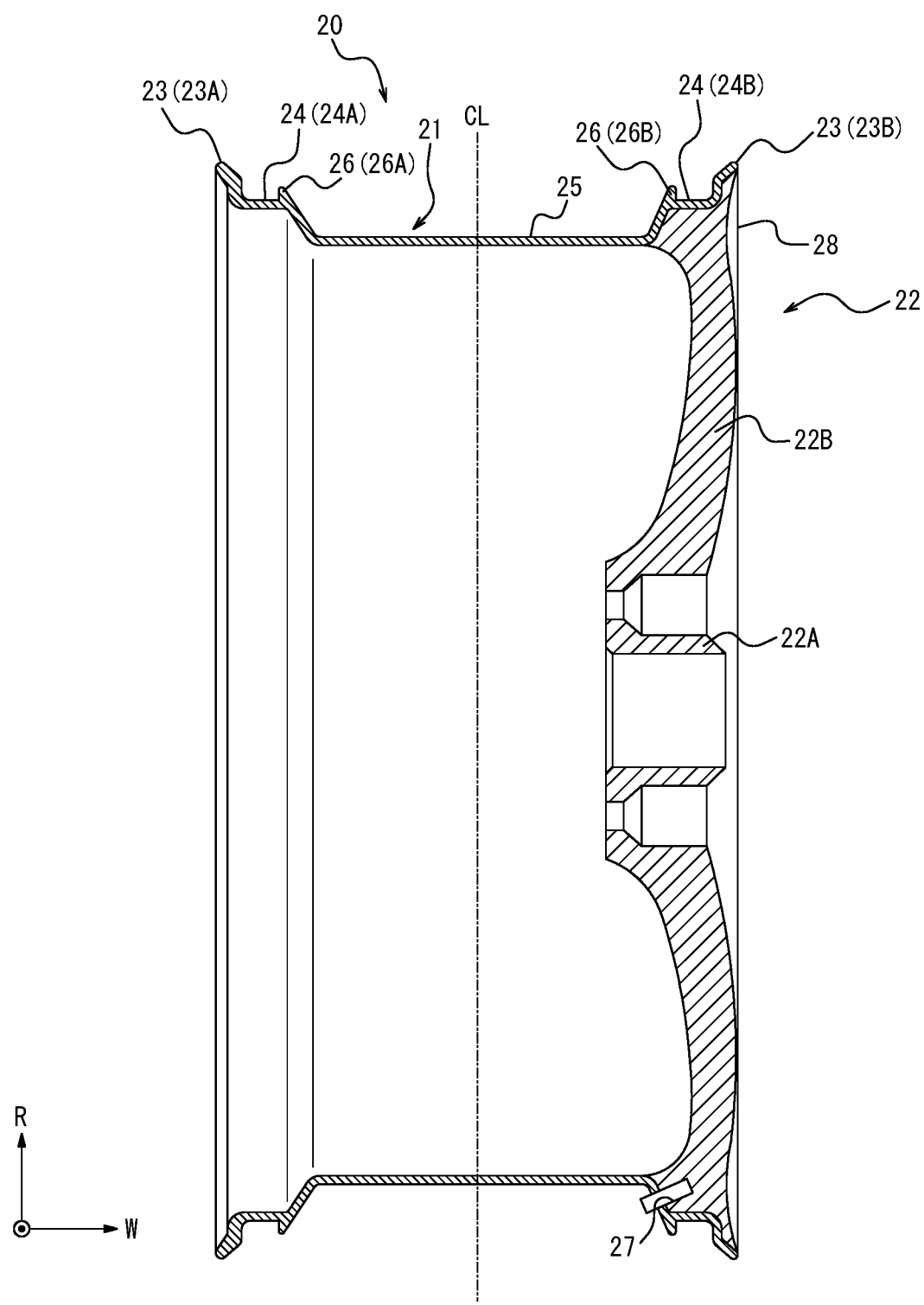
FIG. 3 is a cross-sectional view in the tire width direction, illustrating the wheel of FIG. 1.

Next, the configuration of the wheel 20 according to an embodiment of the present disclosure, as used in the above-described wireless power reception system 1 according to an embodiment of the present disclosure, is described with reference to FIG. 3 in greater detail. FIG. 3 is a cross-sectional view, in the tire width direction, of the wheel 20 of the present embodiment cut along the tire width direction.

I newly discovered that the power receiving efficiency can be improved by optimizing the configuration of the wheel 20 according to the frequency of the electric power transmitted from the power transmission device 40 (and hence the frequency of the AC current supplied from the power source to the power transmission device 40, the frequency of the AC magnetic field transmitted from the power transmission device 40, and the frequency of the electric power received by the power reception device 30).

More specifically, I newly discovered that if the power reception device 30 is disposed farther inward in the tire radial direction than the wheel 20, as in the example of FIG. 1, then in the case of a low frequency, the inclusion of a magnetic material (such as steel) in a portion of the wheel 20 mainly located between the power transmission device 40 and the power reception device 30 significantly increases the loss of electric power during power reception as compared to when the wheel 20 does not contain a magnetic material. I also newly discovered that in case of a low frequency, a configuration that, insofar as possible, avoids the inclusion of a magnetic material in a portion of the wheel 20 mainly located between the power transmission device 40 and the power reception device 30 can suppress the loss of electric power during power reception and improve the power receiving efficiency.

Furthermore, I newly discovered that if the power reception device 30 is disposed farther inward in the tire radial direction than the wheel 20, as in the example of FIG. 1, then in the case of a high frequency, a configuration in which the wheel 20 includes a magnetic material (such as steel) in a portion mainly located between the power transmission device 40 and the power reception device 30 has no loss of electric power during power reception in a nearly equivalent manner to when a magnetic material is not included. I have also newly discovered that in the case of a high frequency, the loss of electric power during power reception can be suppressed, and good power reception can be achieved, regardless of whether the wheel 20 includes a magnetic material in a portion mainly located between the power transmission device 40 and the power reception device 30.

The configuration of the wheel 20 described below is based on these findings.

In describing the wheel 20, the terms "tire radial direction", "tire width direction", and "tire circumferential direction" respectively refer to the tire radial direction, tire width direction, and tire circumferential direction in the state in which the tire 10 is assembled on the wheel 20.

As illustrated in FIG. 3, the wheel 20 includes a cylindrical rim 21 and a disk 22 provided on the tire radial inner side of the rim 21 and supported and fixed to the hub 2A of the vehicle 2.

In the example of FIG. 1, the wheel 20 houses the power reception device 30 on the tire radial inner side of the rim 21, that is, in the space enclosed by the rim 21 and the disk 22.

The rim 21 includes, from the tire widthwise outer side, a pair of flanges 23 (inner flange 23A, outer flange 23B), a pair of bead sheets 24 (inner bead sheet 24A, outer bead sheet 24B), and a well 25. The bead portions 11 of the tire 10 are mounted on the bead sheets 24. The flanges 23 extend from the bead sheets 24 outward in the tire radial direction and outward in the tire width direction to support the bead portions 11 of the tire 10 from the side. The well 25 has a shape that is concave inward in the tire radial direction between the pair of bead sheets 24 to facilitate detachment of the tire. The well 25 therefore has an inclined surface that extends farther inward in the tire radial direction with increased distance inward in the tire width direction from the boundary with the bead sheets 24 to the bottom surface of the well 25. Furthermore, the bead sheets 24 include a pair of humps 26 (inner hump 26A, outer hump 26B) on the tire widthwise inner side. The humps 26 protrude outward in the tire radial direction to prevent the bead portions 11 of the tire 10 from falling into the well 25.

In the case of a low frequency, the rim 21 is preferably formed partially or completely from a non-magnetic material. This can improve the power receiving efficiency as compared to if the rim 21 were formed only from a magnetic material (such as steel).

On the other hand, in the case of a high frequency, good power reception can be achieved regardless of whether the rim 21 is formed from a non-magnetic material or a magnetic material.

Since the rim 21 tends to be located between the power transmission device 40 and the power reception device 30 during power reception in the case in which the power reception device 30 is located farther inward in the tire radial direction than the wheel 20, as in the example of FIG. 1, such optimization of the material of the rim 21 contributes greatly to improving the power receiving efficiency.

When at least a part of the rim 21 is formed from a non-magnetic material, the non-magnetic material may, for example, be a resin material.

In the state in which the tire 10 is mounted on the rim 21, for example, the portion of the rim 21 opposite the tread portion 13 of the tire 10 may be formed from a non-magnetic material, and the portion farther outward in the tire width direction may be formed from a magnetic material (such as steel). In the case of a low frequency, this can improve the power receiving efficiency as compared to if the rim 21 were formed entirely from a magnetic material.

The rim 21 of the wheel 20 further includes a valve 27 for filling the inner cavity of the tire 10 with a gas, such as air, when the tire 10 is mounted.

The disk 22 includes a ring-shaped mounting portion 22A forming the radial inner end and a plurality of spokes 22B extending outward from the mounting portion 22A in the tire radial direction. The mounting portion 22A is a portion coupled and fixed to the hub 2A of the vehicle 2 and has a mounting hole, which penetrates in the tire width direction, for inserting a bolt or the like to fix the hub 2A and the mounting portion 22A. The tire radial outward ends of the spokes 22B are coupled integrally to the edge of the tire radial inner surface of the rim 21.

The disk 22 tends to be located farther outward in the tire width direction than the power transmission device 40 and the power reception device 30 during power reception.

Accordingly, in the case of a low frequency, good power reception can be achieved regardless of whether the disk 22 is formed only from a non-magnetic material or formed to include a magnetic material. Forming the disk 22 to include a magnetic material can suppress attenuation of the magnetic field transmitted from the power transmission device 40 to the power reception device 30 due to the influence of other magnetic fields and of metal that may exist outside the disk 22 in the tire width direction, thereby improving the power receiving efficiency.

On the other hand, in the case of a high frequency, good power reception can be achieved regardless of whether the disk 22 is formed only from a non-magnetic material or formed to include a magnetic material.

Examples of the magnetic material that can form part or all of the disk 22 include steel and ferrite.

A resin material, for example, is suitable as a non-magnetic material that can form part or all of the disk 22. Resin materials have the advantage of being lightweight.

The disk 22 of the wheel 20 includes a wheel cover 28 that covers the tire widthwise outer side of the spokes 22B. The wheel cover 28 tends to be located farther outward in the tire width direction than the power transmission device 40 and the power reception device 30 during power reception.

Accordingly, in the case of a low frequency, good power reception can be achieved regardless of whether the wheel cover 28 is formed only from a non-magnetic material or formed to include a magnetic material. Forming the wheel cover 28 to include a magnetic material can suppress attenuation of the magnetic field transmitted from the power transmission device 40 to the power reception device 30 due to the influence of other magnetic fields and of metal that may exist outside the wheel cover 28 in the tire width direction, thereby improving the power receiving efficiency.

On the other hand, in the case of a high frequency, good power reception can be achieved regardless of whether the wheel cover 28 is formed only from a non-magnetic material or formed to include a magnetic material.

Examples of the magnetic material that can form part or all of the wheel cover 28 include steel and ferrite.

A resin material, for example, is suitable as a non-magnetic material that can form part or all of the wheel cover 28.

Figure 4:
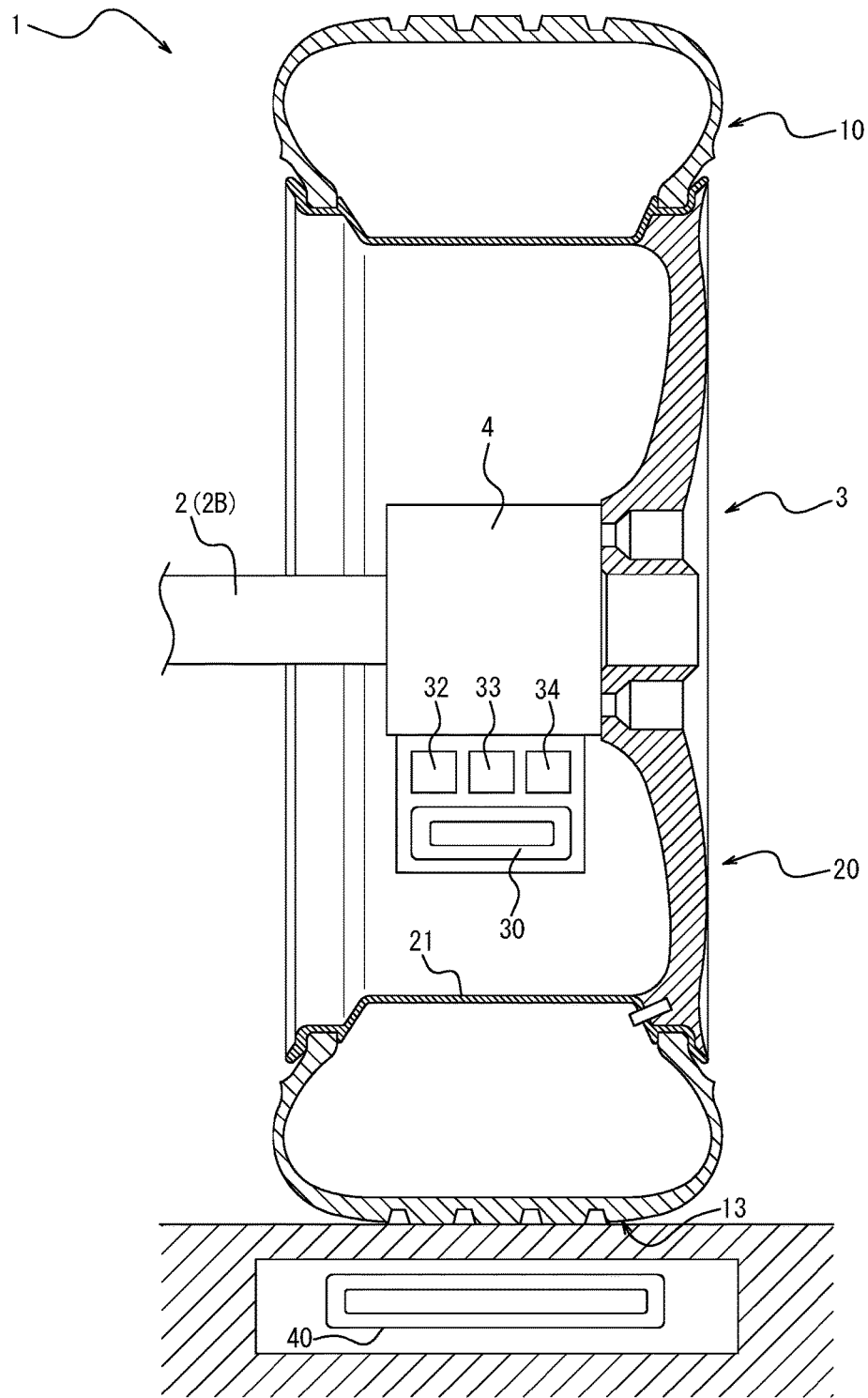
FIG. 4 is a diagram schematically illustrating a variation of a wireless power reception system according to an embodiment of the present disclosure, using a cross-section in the tire width direction.

A variation of the wireless power reception system 1 according to an embodiment of the present disclosure is now described. FIG. 4 is a diagram schematically illustrating a variation of a wireless power reception system 1 according to an embodiment of the present disclosure, using a cross-section in the tire width direction. The variation of the wireless power reception system 1 differs from the wireless power reception system 1 illustrated in FIG. 1 by further including an in-wheel motor 4 housed in a wheel 20.

In the variation of the wireless power reception system 1, the same reference signs are attached to members and components shared in common with the wireless power reception system 1 illustrated in FIG. 1, and a description thereof is omitted.

In the example of FIG. 4, the in-wheel motor 4 is integrated with the hub, installed within the wheel 20, and configured to rotate the tire 10 and wheel 20. The in-wheel motor 4 may, as illustrated in FIG. 4, be attached to the wheel 20 so that a portion thereof is located farther outward in the tire width direction than the wheel 20.

In the example of FIG. 4, the power reception device 30 is attached to the in-wheel motor 4. The in-wheel motor 4 is attached to the drive shaft 2B of the vehicle 2, which is a car or the like (not entirely depicted). However, as described above, the power reception device 30 can be attached to any position, inside the tire/wheel assembly 3, that is within the tire width direction region corresponding to the tire 10 and farther inward in the tire radial direction than the tread portion 13 of the tire 10.

The specific attachment position of the power reception device 30 may, for example, be the tire radial outer side of the rim 21. When the power reception device 30 is attached to the radial outer side of the rim 21, the wheel 20 may be formed from either a magnetic material or a non-magnetic material.

The power reception device 30 may be attached to the tire radial inner side of the rim 21. When the power reception device 30 is attached to the radial inner side of the rim 21, the wheel 20 is preferably formed from a non-magnetic material.

The power conversion circuit 32 converts the electric power generated in the power reception coil 30 into DC power, and supplies the DC power to the electricity storage 33 or the in-wheel motor 4 via conductive wires or the like. The electricity storage 33 stores the electric power generated by the power reception coil 30. The electricity storage 33 is, for example, a capacitor, but this example is not limiting. The electricity storage 33 can be any electricity storage device, such as a storage battery. In the case in which the electricity storage 33 is a capacitor, charging and discharging is quicker than with a storage battery. For this reason, the electricity storage 33 that is a capacitor is advantageous when a high degree of immediacy is required, such as when storing the electric power generated in the power reception coil 30 while the vehicle 2 drives over the power transmission device 40 provided on the road.

With this configuration, the electric power received by the power reception device 30 can be used to rotate the in-wheel motor 4.

The wireless power reception system, the tire/wheel assembly, and the tire of the present disclosure are not limited to the above examples, and many variations are possible.

For example, electric power may be supplied from the power transmission device 40 to the power reception device 30 by any method other than electromagnetic induction. For example, electric power may be supplied from the power transmission device 40 to the power reception device 30 by an electric field coupling method.

The tire/wheel assembly 3 and tire 10 may also be attached to any moveable body with tires (such as a motorcycle, wheelchair, or cart) other than the vehicle 2. In this case, the tire 10 need not have a carcass 14 and/or a belt 15.

In each of the above examples, the space between the tire 10 and the rim 21 is described as being filled with air, but this example is not limiting. For example, the space between the tire 10 and the rim 21 can be filled with a gas such as nitrogen. The space between the tire 10 and the rim 21 is not limited to being filled with gas and may be filled with any fluid, including a liquid, a gel-like substance, or a granular material.

In each of the above examples, the tire 10 is described as being a tubeless tire provided with the inner liner 16, but this configuration is not limiting. For example, the tire 10 may be a tube-type tire provided with a tube. Also, for example, the tire 10 may be an airless tire formed in whole or in part by the above-described resin material and used without the space between the tire 10 and the rim 21 being filled with a gas.

In each of the above examples, the ratio SW/OD of the cross-sectional width SW to the outer diameter OD of the tire 10 is 0.26 or less in the case in which the cross-sectional width SW of the tire 10 is less than 165 (mm), and the cross-sectional width SW (mm) and the outer diameter OD (mm) of the tire 10 preferably satisfy the following relational expression (Relational Expression (1)) in the case in which the cross-sectional width SW of the tire 10 is 165 (mm) or more.

$$OD \text{ (mm)} \geq 2.135 \times SW \text{ (mm)} + 282.3 \text{ (mm)}$$

By the ratio SW/OD or Relational Expression (1) being satisfied, the cross-sectional width SW of the tire 10 becomes relatively small in relation to the outer diameter OD of the tire 10, thereby reducing air resistance. The narrower cross-sectional width secures vehicle space, in particular space for installation of drive components near the vehicle-installed inside of the tire.

Furthermore, by the ratio SW/OD or Relational Expression (1) being satisfied, the outer diameter OD of the tire 10 becomes relatively large in relation to the cross-sectional width SW of the tire 10, thereby reducing rolling resistance. The wheel axle also becomes higher due to the larger diameter of the tire 10, expanding the space under the floor and thereby securing space for the trunk and the like of the vehicle and space for installation of drive components.

As described above, by the ratio SW/OD or Relational Expression (1) being satisfied, high fuel efficiency can be achieved for the supplied electrical energy, and a large amount of vehicle space can also be secured.

The cross-sectional width SW (mm) and the outer diameter OD (mm) of the tire 10 also preferably satisfy the following relational expression (Relational Expression (2)).

$$OD \text{ (mm)} \geq -0.0187 \times SW \text{ (mm)}^2 + 9.15 \times SW \text{ (mm)} - 380 \text{ (mm)}$$

By Relational Expression (2) being satisfied, the cross-sectional width SW of the tire becomes relatively small in relation to the outer diameter OD of the tire 10, thereby reducing air resistance. The narrower cross-sectional width also secures vehicle space, in particular space for installation of drive components near the vehicle-installed inside of the tire 10.

Furthermore, by Relational Expression (2) being satisfied, the outer diameter OD of the tire becomes relatively large in relation to the cross-sectional width SW of the tire 10, thereby reducing rolling resistance. The wheel axle also becomes higher due to the larger diameter of the tire 10, expanding the space under the floor and thereby securing space for the trunk and the like of the vehicle and space for installation of drive components.

As described above, by Relational Expression (2) being satisfied, high fuel efficiency can be achieved for the supplied electrical energy, and a large amount of vehicle space can also be secured.

In each of the above examples, the tire 10 preferably satisfies the ratio SW/OD and/or Relational Expression (2), or satisfies Relational Expression (1) and/or Relational Expression (2).

In each of the above examples, the tire 10 preferably satisfies the ratio SW/OD and/or Relational Expression (2), or satisfies Relational Expression (1) and/or Relational Expression (2), in the case in which the internal pressure is 250 kPa or more.

In each of the above examples, the tire 10 is preferably used at an internal pressure of 250 kPa or more. In this case, in particular when the internal pressure is 250 kPa or more, the tire 10 preferably satisfies the ratio SW/OD and/or Relational Expression (2), or satisfies Relational Expression (1) and/or Relational Expression (2). Both the tire rolling resistance and the tire weight can thereby be reduced. Consequently, a good power supply efficiency and high fuel efficiency can both be achieved.

In each of the above examples, the tire 10 is preferably configured so that the cross-sectional area S1 of the bead filler 11B in the tire width direction is one or more times and eight or less times the cross-sectional area S2 of the bead core 11A in the tire width direction. A good power supply efficiency and high fuel efficiency can both thereby be achieved.

In the case of a sandwiched bead core structure in which the carcass is held from the tire widthwise inner and outer sides, the total volume of the bead cores on the widthwise inner and outer sides of the carcass is defined as S2.

By the cross-sectional area S1 of the bead filler 11B being set to the above range, the volume of the bead filler, which is a highly rigid member, can be reduced to reduce the longitudinal spring coefficient of the tire and improve ride comfort. In addition, the bead filler can be made lighter to reduce the weight of the tire, thereby further reducing the tire rolling resistance.

In particular, in a narrow width and large diameter tire that satisfies Relational Expression (1) or Relational Expression (2), the tension rigidity of the belt is high, and the tension rigidity of the tire side portions is low compared to the belt. Setting the cross-sectional area S1 of the bead filler to a predetermined range as described above is therefore extremely effective for reducing the longitudinal spring coefficient.

Here, if the cross-sectional area S1 of the bead filler 11B in the tire width direction is more than eight times the cross-sectional area S2 of the bead core 11A in the tire width direction, the volume of the bead filler, which is a highly rigid member, grows large, and the longitudinal spring coefficient of the tire is not sufficiently reduced. This may result in a decrease in ride comfort.

On the other hand, if the cross-sectional area S1 of the bead filler 11B in the tire width direction is less than the cross-sectional area S2 of the bead core 11A in the tire width direction, the rigidity of the bead portion may significantly decrease, and the transverse spring coefficient may be reduced too much to secure steering stability.

In the tire 10 of each of the above examples, the following relational expression is preferably satisfied, where BFW (FIG. 2) is the width in the tire width direction at a central position of the bead filler 11B in the tire radial direction, and BDW (FIG. 2) is the maximum width in the tire width direction of the bead core 11A.

$$0.1 \leq BFW/BDW \leq 0.6$$

A good power supply efficiency and high fuel efficiency can both thereby be achieved.

By the ratio BFW/BDW being set to 0.6 or less, the volume of the bead filler is reduced while maintaining the bead filler height. This secures rigidity in the tire rotation direction while reducing the longitudinal spring coefficient to improve ride comfort, and can also reduce the weight of the tire.

On the other hand, by the ratio BFW/BDW being set to 0.1 or more, the rigidity of the bead portion can be secured, the transverse spring coefficient can be maintained, and the steering stability can be further secured.

In the tire 10 of each of the above examples, the following relational expression is preferably satisfied, where BFH (FIG. 2) is the height of the bead filler 11B in the tire radial direction, and SH (FIG. 2) is the sectional height of the tire (tire section height).

$$0.1 \leq BFH/SH \leq 0.5$$

A good power supply efficiency and high fuel efficiency can both thereby b e achieved.

By the ratio BFH/SH being set to 0.5 or less, the radial height of the bead filler, which is a highly rigid member, can be decreased to effectively reduce the longitudinal spring coefficient of the tire and improve ride comfort.

On the other hand, by the ratio BFH/SH being set to 0.1 or more, the rigidity of the bead portion can be secured, the transverse spring coefficient can be maintained, and the steering stability can be further secured.

Here, the tire sectional height SH refers to ½ of the difference between the outer diameter of the tire and the rim diameter in a state with no load when the tire is mounted on the rim and filled to the internal pressure specified for each vehicle on which the tire is mounted.

The height BFH (FIG. 2) of the bead filler 11B in the tire radial direction is preferably 45 mm or less. A good power supply efficiency and high fuel efficiency can both thereby be achieved.

In each of the above examples, the tire 10 is preferably configured so that the ratio Ts/Tb of the gauge Ts (FIG. 2) of the sidewall portion 12 at the tire maximum width portion to the bead width Tb (width of the bead portion 11 in the tire width direction, FIG. 2) at the center position of the bead core 11A in the tire radial direction is 15% or more and 60% or less. A good power supply efficiency and high fuel efficiency can both thereby be achieved.

The "tire maximum width portion" refers to the maximum width position in a tire widthwise cross-section when the tire is mounted on the rim and is under no load.

The gauge Ts is the total thickness of all of the members, such as the rubber, the reinforcement member, and the inner liner.

In the case of a structure in which the bead core is divided into a plurality of small bead cores by the carcass, Tb may be the distance between the widthwise innermost end and outermost end of all of the small bead cores.

By the ratio Ts/Tb being set to the above range, the rigidity at the tire maximum width portion, where bending deformation is large when the tire is under a load, can be appropriately decreased to reduce the longitudinal spring coefficient and improve ride comfort.

That is, if the ratio Ts/Tb is more than 60%, the gauge of the sidewall portion 12 at the tire maximum width portion increases, and the sidewall portion 12 becomes more rigid, which may result in a higher longitudinal spring coefficient. On the other hand, if the ratio Ts/Tb is less than 15%, the transverse spring coefficient may be reduced too much to secure the steering stability.

In each of the above examples, the tire 10 is preferably configured so that the gauge Ts (FIG. 2) of the sidewall portion 12 at the tire maximum width portion is 1.5 mm or more. A good power supply efficiency and high fuel efficiency can both thereby be achieved.

By the gauge Ts being 1.5 mm or more, the rigidity at the tire maximum width portion can be maintained at an appropriate level to suppress a reduction in the transverse spring coefficient and to further secure the steering stability.

In each of the above examples, the tire 10 is preferably configured so that the diameter Tbc (maximum width in the tire width direction of the bead core, FIG. 2) of the bead core 11A is 3 mm or more and 16 mm or less. A good power supply efficiency and high fuel efficiency can both thereby be achieved.

A diameter Tbc of 3 mm or more can achieve a reduction in weight while ensuring bending rigidity and torsional rigidity on the rim flange, whereas a diameter Tbc of 16 mm or less can achieve steering stability while suppressing an increase in weight.

In each of the above examples, the tire 10 is preferably configured so that the footprint area of the tire 10 is 8,000 $mm^2$ or more when the tire 10 is under the maximum load specified for each vehicle on which the tire is mounted. This can achieve both a reduction in the tire rolling resistance and a reduction in the weight of the tire, thereby achieving both good power supply efficiency and high fuel efficiency. In addition, the tire axial force can be secured to improve the stability and safety of the vehicle.

In each of the above examples, the tire 10 is preferably configured so that the Young's modulus of the belt cord 15c is 40,000 MPa or more. This can optimize the carcass structure and the belt rigidity to ensure a tire strength that enables use even at high internal pressure. Furthermore, a good power supply efficiency and high fuel efficiency can both be achieved.

In each of the above examples, the tire 10 is preferably configured so that the thickness of the inner liner 16 is 0.6 mm or more. This can suppress air leakage in a high internal pressure state. Furthermore, a good power supply efficiency and high fuel efficiency can both be achieved.

In each of the above examples, the tire 10 is preferably configured so that the ratio Ts/Tc of the gauge Ts (FIG. 2) of the sidewall portion 12 at the tire maximum width portion to the diameter Tc (FIG. 2) of the carcass cord is 4 or more and 12 or less. A good power supply efficiency and high fuel efficiency can both thereby be achieved.

By the ratio Ts/Tc being set to the above range, the rigidity at the tire maximum width portion, where bending deformation is large when the tire is under a load, can be appropriately decreased to reduce the longitudinal spring coefficient and improve ride comfort.

That is, if the ratio Ts/Tc is more than 12, the gauge of the sidewall portion 12 at the tire maximum width portion increases, increasing the rigidity of this portion, which may result in a higher longitudinal spring coefficient. On the other hand, if the ratio Ts/Tc is less than 4, the transverse spring coefficient may be reduced too much to secure the steering stability.

In each of the above examples, the tire 10 is preferably configured so that the ratio Ta/Tc of the distance Ta (FIG. 2) to the diameter Tc (FIG. 2) of the carcass cord is 2 or more and 8 or less, where Ta is the distance in the tire width direction from the surface of the carcass cord 14c to the tire outer surface at the tire maximum width portion. A good power supply efficiency and high fuel efficiency can both thereby be achieved.

By the ratio Ta/Tc being set to 8 or less, the gauge of the sidewall portion 12 at the tire maximum width portion can be decreased to reduce the rigidity of the sidewall portion 12, thereby reducing the longitudinal spring coefficient and further improving ride comfort. On the other hand, by the ratio Ta/Tc being set to 2 or more, the transverse spring coefficient can be secured to further secure the steering stability.

Note that "Ta" (FIG. 2) refers to the distance in the tire width direction from the surface of the widthwise outermost carcass cord 14c to the tire outer surface at the tire maximum width portion.

That is, when the carcass folded portion 14B extends radially farther outward than the tire maximum width portion, Ta is the distance in the tire width direction from the surface of the carcass cord 14c at the portion forming the carcass folded-up portion 14B to the tire outer surface.

In each of the above examples, the tire 10 is preferably configured so that the diameter Tc (FIG. 2) of the carcass cord 14c is 0.2 mm or more and 1.2 mm or less. A good power supply efficiency and high fuel efficiency can both thereby be achieved.

By the diameter Tc being set to 1.2 mm or less, the gauge Ts of the sidewall portion can be made smaller relative to the carcass cord diameter Tc, thereby reducing the longitudinal spring coefficient, whereas by the diameter Tc being set to 0.2 mm or more, the gauge Ts of the sidewall portion can be secured relative to the carcass cord diameter Tc, thereby increasing the transverse spring coefficient to secure the steering stability.

INDUSTRIAL APPLICABILITY

The wireless power reception system, the tire/wheel assembly, and the tire of the present disclosure are suitable for use in any moveable body with tires, such as, for example, vehicles, motorcycles, wheelchairs, carts, and the like. Examples of vehicles include passenger vehicles, trucks, buses, agricultural vehicles (such as tractors), and construction or building vehicles (such as dump trucks), with passenger vehicles being particularly suitable.

REFERENCE SIGNS LIST

1 Wireless power reception system
2 Vehicle
2A Hub
2B Drive shaft
3 Tire/wheel assembly
4 In-wheel motor
10 Tire
11 Bead portion
11c Bead wire
11A Bead core
11B Bead filler
12 Sidewall portion
13 Tread portion
14 Carcass
14c Carcass cord
14r Coating rubber
14A Carcass body portion
14B Carcass folded-up portion
15 Belt
15a, 15b Belt layer
15c Belt cord
15r Coating rubber
16 Inner liner
20 Wheel
21 Rim
22 Disk
22A Mounting portion
22B Spoke
23 Flange
24 Bead sheet
25 Well
26 Hump
27 Valve
28 Wheel cover
30 Power reception device (power reception coil)
32 Power conversion circuit
33 Electricity storage
34 Controller
40 Power transmission device (power transmission coil)

The invention claimed is:

1. A wireless power reception system comprising:
a power transmission device;
a power reception device;
a wheel comprising a rim; and
a tire mounted on the rim, wherein
the tire comprises a bead core and a bead filler,
a cross-sectional area S1 of the bead filler in a tire width direction is one or more times and eight or less times a cross-sectional area S2 of the bead core in the tire width direction,
the power transmission device is configured to transmit electric power with a frequency of 1000 kHz or less wirelessly,
the power reception device is disposed farther inward in a tire radial direction than a tread portion of the tire,
the power reception device is disposed farther inward in the tire radial direction than the wheel,
the power reception device is configured to receive the electric power wirelessly through the tread portion of the tire and the wheel from the power transmission device in a state such that the power transmission device is located farther outward in the tire radial direction than the tire,
the tread portion of the tire is formed from a non-magnetic material,
at least a portion of the rim of the wheel is formed from a resin material, and
the power reception device is attached to a hub connected to the wheel.

2. The wireless power reception system of claim 1, wherein
the tire comprises a carcass configured by one or more carcass layers, and
a carcass cord configuring each carcass layer in the one or more carcass layers is formed from a non-magnetic material.

3. The wireless power reception system of claim 2, wherein
the tire comprises a belt configured by one or more belt layers, and
a belt cord configuring each belt layer in the one or more belt layers is formed from a non-magnetic material.

4. The wireless power reception system of claim 1, wherein
the tire comprises a belt configured by one or more belt layers, and
a belt cord configuring each belt layer in the one or more belt layers is formed from a non-magnetic material.

5. A wireless power reception system comprising:
a power transmission device;
a power reception device;
a wheel comprising a rim; and
a tire mounted on the rim, wherein
the tire comprises a bead core and a bead filler,
a cross-sectional area S1 of the bead filler in a tire width direction is one or more times and eight or less times a cross-sectional area S2 of the bead core in the tire width direction, the power transmission device configured to transmit electric power with a frequency higher than 1000 kHz wirelessly, the power reception device is disposed farther inward in a tire radial direction than a tread portion of the tire, the power reception device is disposed farther inward in the tire radial direction than the wheel, the power reception device is configured to receive the electric power wirelessly through the tread portion of the tire and the wheel from the power transmission device in a state such that the power transmission device is located farther outward in the tire radial direction than the tire, the tread portion of the tire is formed from a non-magnetic material or partially formed from a magnetic material, at least a portion of the rim of the wheel is formed from a resin material, and the power reception device is attached to a hub connected to the wheel.

6. The wireless power reception system of claim 5, wherein the tire comprises a carcass configured by one or more carcass layers, and a carcass cord configuring each carcass layer in the one or more carcass layers is formed from a magnetic material.

7. The wireless power reception system of claim 6, wherein the tire comprises a belt configured by one or more belt layers, and a belt cord configuring each belt layer in the one or more belt layers is formed from a magnetic material.

8. The wireless power reception system of claim 5, wherein the tire comprises a belt configured by one or more belt layers, and a belt cord configuring each belt layer in the one or more belt layers is formed from a magnetic material.

* * * * *